(No Model.)

H. A. TOBELMAN.
BAKING PAN.

No. 580,337.          Patented Apr. 6, 1897.

WITNESSES:
C. S. Kelley
L. V. Lightell

INVENTOR
Henry A. Tobelman
BY
F. D. Thomas
ATTORNEY

UNITED STATES PATENT OFFICE.

HENRY A. TOBELMAN, OF BROOKLYN, NEW YORK.

BAKING-PAN.

SPECIFICATION forming part of Letters Patent No. 580,337, dated April 6, 1897.

Application filed May 10, 1895. Serial No. 548,871. (No model.)

*To all whom it may concern:*

Be it known that I, HENRY A. TOBELMAN, a citizen of the United States, residing at Brooklyn, Kings county, New York, have invented certain new and useful Improvements in Baking-Pans, of which the following is a specification.

This invention relates to certain improvements in that class of pans employed for baking cakes, pies, and the like which are provided with knives pivotally mounted in their bottoms and adapted to be turned or swung around on their pivotal points when the cake or pie has been baked, so as to cut the same loose from the bottom and sides of the pan and permit it to be freely removed therefrom; and the object of the invention is to provide a baking-pan of this general character of an improved and inexpensive construction.

The invention comprises a baking-pan provided with a stud projecting centrally from its bottom, in combination with a knife having a slotted end adapted to receive the said stud, whereby the said knife may be removably attached to the baking-pan when it is desired to use the same for baking purposes and may be entirely removed from the pan when it is desired to cleanse the parts.

The invention also contemplates providing an improved stop or guide formed on the under side of the knife at its outer end and adapted to engage the edge of the baking-pan when the knife is being used, so as to guide the same.

The invention will be hereinafter set forth, and its novel features carefully defined in the claim.

Figure 1:
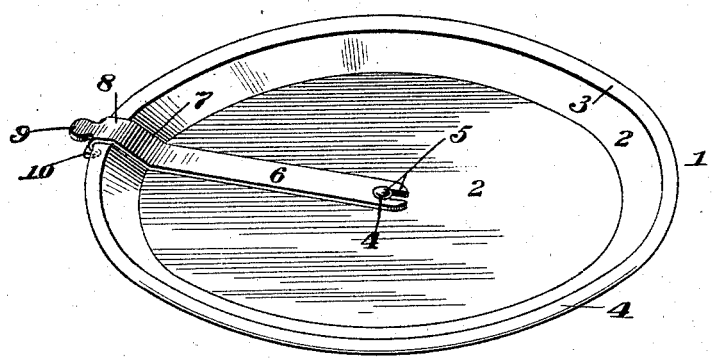
Figure 2:
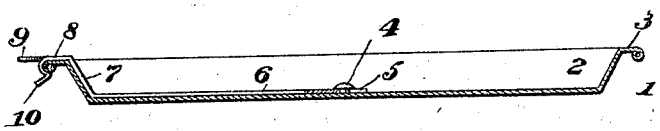

In the accompanying drawings, wherein I have illustrated my improvements embodied in a baking-pan such as is employed for baking pies, &c., Figure 1 is a perspective view showing the pan and the knife applied thereto in position for use, and Fig. 2 is a sectional view showing the construction of the parts.

In the views, 1 represents the baking-pan, which is, as herein shown, of an ordinary form provided with somewhat coned sides 2 and having a projecting flange or margin 3 at its upper edge. In the bottom of the pan is formed or provided a projecting stud or pin 4, having a head or enlargement formed at its upper end, and the shank or lower portion of said pin 4 is adapted to enter a slot 5, formed at the end of a knife 6, being of a length substantially equal to the thickness of said knife, whereby when the knife is in place said head will fit closely against the upper face thereof.

The pin 4 is by preference secured to the upper surface of the bottom of the pan 1 and does not extend through the same, whereby the under side of the pan-bottom is kept perfectly smooth and imperforate, so as to be free from unevenness such as would be formed were the pin extended through said bottom.

The inner end of the knife 6 extends parallel to and lies flat against the smooth upper surface of the pan-bottom, and at its outer end said knife is bent up at an inclination, as seen at 7, parallel to the inclined side 2 of the pan, and at its extremity 8 the said knife 6 is bent out parallel to the flat margin 3 of the pan, being of such a length as to extend out slightly beyond said margin, as clearly seen in the drawings.

The extremity of the knife 6 is stamped or cut out in such a way that its central portion 9 forms a convenient handle to be grasped by the fingers when it is desired to operate the knife, while the side portions or wings 10 of the said extremity are bent down in such a way as to be adapted to engage under the flat margin 3 of the pan 1, thereby forming stops or guides to engage the said margin when the knife is in place and hold the outer end of the knife down close against the surface of the pan, the inner end of the said knife being held down to the pan by being engaged under the head of the pin 4. By this construction it will be readily seen that the knife is made removable from the pan, so that each part may be kept entirely clean, whereby the device is rendered not only more satisfactory for use in cooking on account of cleanliness, but the life of the parts is augmented by preventing the pan and knife from becoming rusted at the pivotal point, as would be liable to be the case were it impossible to wipe the contacting surfaces perfectly dry.

The construction of the device as above set forth also permits of one knife being employed for use with either of a series of pans, and the said pans may in some cases vary in size, in which case it will only be necessary to increase the length of the slot 5. It will usually be desirable to make said slot sufficiently long to permit of the device adapting itself to slight inequalities in the various pans with which the knife is used.

As above stated, when the knife is in place in the pan it will be held at its inner end closely against the pan-bottom by means of the head of pin 4, and at its outer end it will be held down to the surface of the pan by the engagement of the stops or guides 10 under the flat margin 3 of the pan, and the slot 5 in the end of the knife will usually be of such a length that said guides 10 will be permitted to contact at all times with the under side of the pan-margin.

Having thus described my invention, I claim—

The combination of a pan having a headed pin projecting centrally from its bottom, and a removable knife having one end slotted and adapted to be engaged under said headed pin, and having its outer end cut out to form a central handle and lateral wings, said wings being bent downwardly into position to engage under the margin of the pan, substantially as set forth.

In witness whereof I have hereunto signed my name in the presence of two subscribing witnesses.

HENRY A. TOBELMAN.

Witnesses:
H. C. BACKUS,
L. V. LIGHTELL.